United States Patent [19]

Ohno et al.

[11] 4,188,424
[45] Feb. 12, 1980

[54] METAL CARRIER FOR TRIM

[75] Inventors: Tsuneo Ohno, Anjio; Kunio Maeno, Jushiyama; Takahiko Kasuya; Takao Nakajima, both of Ichinomiya, all of Japan

[73] Assignee: Toyoda Gosei Co., Ltd., Nagoya, Japan

[21] Appl. No.: 862,590

[22] Filed: Dec. 20, 1977

[30] Foreign Application Priority Data

Dec. 21, 1976 [JP] Japan .................. 51/171577[U]
Apr. 30, 1977 [JP] Japan .................. 52/55146[U]

[51] Int. Cl.² .............. B60R 13/02; B32B 3/02; B32B 3/10; B32B 3/24; B32B 15/06
[52] U.S. Cl. ..................... 428/572; 49/490; 52/716; 428/134; 428/156; 428/157; 428/167; 428/457
[58] Field of Search ............. 428/31, 134, 136, 156, 428/157, 167, 457, 463, 465, 572; 49/490, 491; 52/716, 717

[56] References Cited

U.S. PATENT DOCUMENTS

| 3,167,856 | 2/1965 | Zoller | 49/490 X |
|---|---|---|---|
| 3,256,577 | 6/1966 | Bright | 49/491 X |
| 3,310,928 | 3/1967 | Weimar | 49/491 X |
| 3,699,718 | 10/1972 | Kimura | 49/491 |
| 4,010,573 | 3/1977 | Andrzejewski | 428/31 X |
| 4,042,741 | 8/1977 | Bright | 49/491 |
| 4,081,504 | 3/1978 | Wenrick et al. | 428/31 X |
| 4,113,295 | 9/1978 | Wenrick | 428/31 X |

FOREIGN PATENT DOCUMENTS

694835 9/1964 Canada ..................... 49/490

*Primary Examiner*—Harold Ansher
*Attorney, Agent, or Firm*—Armstrong, Nikaido, Marmelstein & Kubovcik

[57] ABSTRACT

A metal carrier is embedded into trim, for providing proper rigidness in the transverse direction as well as in the longitudinal direction to the strip-like trim formed with rubber or plastics and the like. Transverse slots are formed in the strip-like sheet metal at given intervals in the longitudinal direction and a thin link portion and/or narrow width portion (sectional area in the transverse direction is small) is alternately formed at the top and bottom portions of the transverse slot. When an external force is applied to the metal carrier covered with rubber or plastics, the formed connecting links of the thin link portion and/or narrow width portion at top and bottom are broken, and the metal carrier becomes a continuous zigzag strip.

9 Claims, 18 Drawing Figures

METAL CARRIER FOR TRIM

BACKGROUND OF THE INVENTION

1. Field of the Invention

The present invention relates to a metal carrier made of sheet metal embedded into trim to provide proper rigidness in the transverse direction as well as in the longitudinal direction; particularly the carrier is not cut or broken prior to being covered with rubber or plastics and the like, but after being covered, i.e., in the embedded state, the strip is partially cut or broken and thus attains flexibility and elasticity in the longitudinal direction.

2. Description of the Prior Art

It is well known that trims are applied to a corner portion or mating portion of motorcars, furniture, etc. for the purpose of ornamentation, protection and sealing. The trim is bent in U-shape form in the transverse direction after forming.

Figure 1:
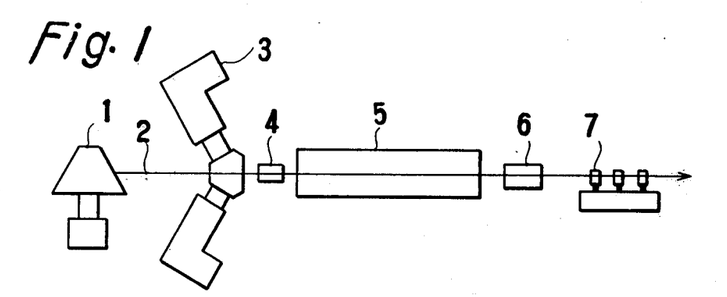
FIG. 1 is a diagrammatic view of the process for forming the trim using the metal carrier.
Figure 2:
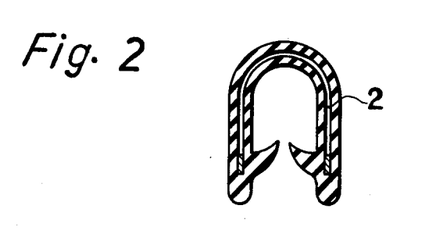
FIG. 2 is a cross sectional view of the embodiment of the trim.

The forming process of the trim is shown in FIG. 1. From a winding roll 1, a metal carrier 2 made of sheet metal, is covered with rubber or plastic covering material, by means of an extruder 3, then embossed through an embossing roll 4, and in the case of rubber, vulcanized through a curing unit 5, and formed at a take-off unit 6, and then bent by means of a forming machine for bending 7. This process produces the sectional form as shown in FIG. 2. Metal carriers such as those shown in FIGS. 3 to 7 have been generally used.

Figure 3:
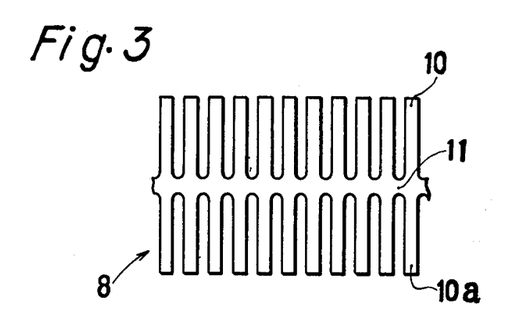
FIG. 3 is a plan view showing an example of the conventional trim.

In the case the metal carrier 8 shown in FIG. 3, strip-like element 10 arranged approximately regular intervals connected with a connecting link 11 at the center portion of the strip. The formed trim using this metal carrier has a certain degree of flexibility, thus providing relatively good working characteristic for applying to the corner portion of an object. However, since the connecting link 11 is connected to the strips 10 at the center portion, the carrier 8 lacks in flexibility in the longitudinal direction. And, when winding the metal carrier 8 on the winding roll 1, the carrier is liable to transform in the transverse direction and when extruding rubber or plastics to cover the carrier, working characteristics are not good and thus liable to generate inferior goods.

Figure 4:
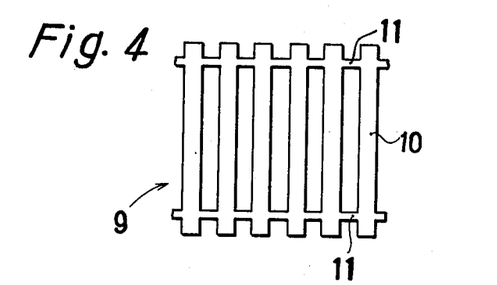
FIG. 4 is a plan view showing a different example of a conventional trim.

The metal carrier 9 shown in FIG. 4 has the strip-like element 10 arranged at approximately regular intervals which are connected with the connecting link 11 at a position slightly inward from both marginal regions. The metal carrier 9 has good working characteristic when extruding covering material, but it lacks elasticity and flexibility in the longitudinal direction of the formed trim, so that working characteristics for applying it to the corner portion of the object member is not good.

Figure 5:
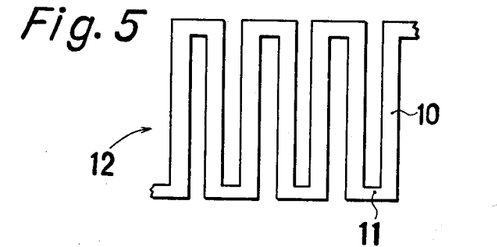
FIG. 5 is a plan view showing further another example of the conventional trim.
Figure 6:
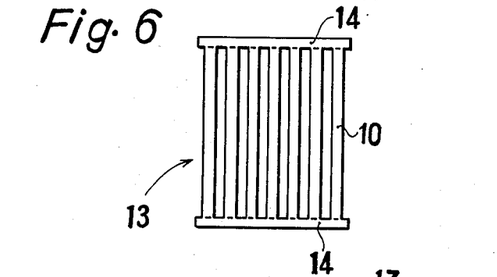
FIG. 6 is a plan view showing still another example of the conventional trim.

The metal carrier 12 shown in FIG. 5 has the striplike element 10 arranged at approximately regular intervals is alternatively connected with the connecting link 11 in a zigzag pattern at both marginal regions. The metal carrier 12 has flexibility in the longitudinal direction for the formed trim, but when extruding the covering material of rubber or plastic the metal carrier 12 stretches in the longitudinal direction, so that working characteristics are not good. The metal carrier 13 shown in FIG. 6 has the striplike element 10 arranged at approximately regular intervals is connected with two strip edges 14 at both marginal regions and the strip edges can be easily cut or broken from the striplike element 10 by bending. The metal carrier 13 is covered with covering material with the strip edges 14 exposed and the opening resulting from the cutting and removing of the strip edges 14 is repaired by filling. The metal carrier 13 is thus embedded into trim in a discontinuation state, so that the formed trim has flexibility and elasticity in the longitudinal direction and the working characteristics are good when extruding, but the process for manufacturing the trim is complicated and the metal carrier 13 comes out of the covering material when the trim is subject to sudden transformation such as twisting and the like.

Figure 7:
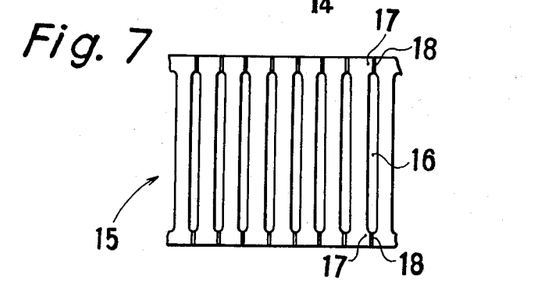
FIG. 7 is a plan view showing yet still another example of the conventional trim.

The metal carrier 15 shown in FIG. 7 has in the strip-like element many transverse slots 16 in the transverse direction which are formed at given intervals in the longitudinal direction.

At the top and bottom of the connecting links 17 are the thin link portions 18 which are thin and may be easily cut or broken by an external force. The metal carrier 15 is covered with rubber or plastics and then the connecting links 17 at top and bottom are cut by external force, thus putting the metal carrier 15 in discontinuation state. Although the formed trim has flexibility and elasticity in the longitudinal direction, when winding the metal carrier 15 on the winding roll or when extruding covering material it is susceptible to cutting and separation, so that the working characteristics are not good. Moreover, like the metal carrier 13 shown in FIG. 6, the metal carrier 15 which is embedded into the trim is discontinuous, so that when the trim is subjected to sudden transformation such as twisting the metal carrier 15 comes out of the covering material.

OBJECT OF THE INVENTION

The first object of this invention is to provide a metal carrier having good working characteristics for extruding trim.

A second object of this invention is to provide a metal carrier which forms a trim having elasticity and flexibility in the longitudinal direction as well as has good working characteristics for applying it to an object.

A third object of this invention is to provide a metal carrier which is free of coming out of the covering material even if the formed trim is subject to sudden transformation such as twisting and the like.

A fourth object of this invention is to provide a metal carrier which can be partially cut at given spots of the trim by applying external force after extruding the trim.

Other objects of the present invention will be apparent in the following description and accompanying drawings.

DETAILED DESCRIPTION OF THE PREFERRED EMBODIMENTS

The present invention is directed to a metal carrier which can be cut or broken at particular locations after being covered with rubber of plastics by an external force being applied thereto. This metal carrier comprises a thin link portion and/or narrow width portion alternately formed in the connecting links at the top and bottom of transverse slots, in the strip-like element. The working characteristics for extruding and for applying the carrier with the extrusion thereon to an object is good when compared to the prior art.

With reference to the drawings several examples of the present invention will be illustrated in the following:

EXAMPLE 1

Figure 9:
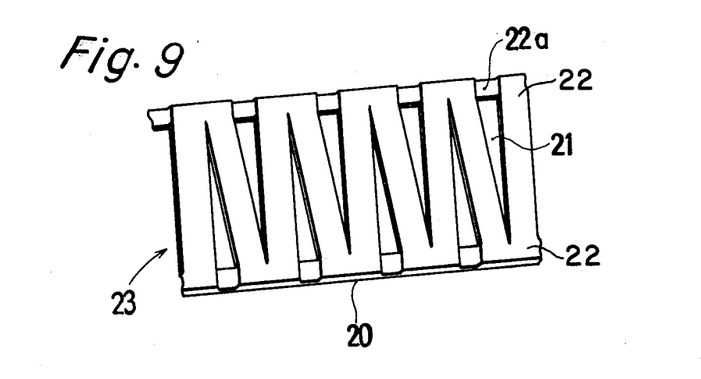
FIG. 9 is a perspective view showing the metal carrier of the Example 1 of the present invention.

As shown in FIG. 9, many wedge-like slots 21 are arranged on a strip-like element 20 so as to be alternate with respect to directions. A link 22 includes a thin link portion 22a which can be easily cut by an external force on the connection links at top and bottom of the wedge-like slot 21. In addition, a groove may be arranged on the thin link portion 22 to facilitate cutting.

Figure 8:
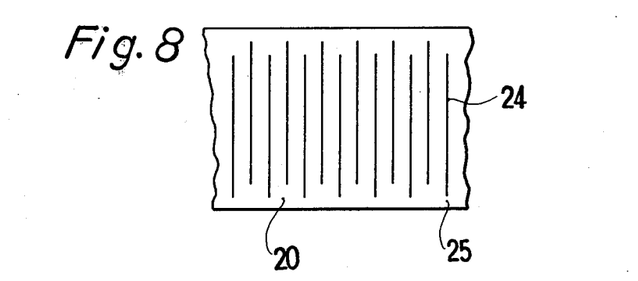
FIG. 8 is a plan view showing the material for the metal carrier of the Example 1 of the present invention.

The formation of a metal carrier 23 is, as shown in FIG. 8, that many lines of slits 24 are cut on the strip-like element 20 at regular intervals and the wedge-like slots 21, as shown in FIG. 9, are formed with the slits 24 spread by blowpressing the remaining short marginal region 25 at both ends.

Next, illustration will be made to the embodiment of the metal carrier of the Example 1.

Like the conventional way, the metal carrier 23 is taken out from the winding roll 1 and covered with covering material by means of the extruder 3. At this time, since the carrier is connected at top and bottom of the wedge-like slot 21, the carrier does not change in the transverse direction nor expand in the longitudinal direction, so that working characteristics are good in the course of extruding. And, even if a thin link portion 22a is cut in the course of extruding, the cut spots will be few and other marginal regions will be left connected, so that expansion in the longitudinal direction will rarely happen nor have influence upon the working characteristics for extruding. Next, after vulcanizing and prior to passing the trim to the forming machine for bending, the thin link portion 22a are cut or broken by applying an external force and then made to the given curved form by means of the bend forming machine 7, thus attaining the curved form trim as shown in FIG. 2.

Since the metal carrier 23 is embedded into the trim in a zigzag pattern, this trim has flexibility and elasticity in the longitudinal direction and has good working characteristics for applying to objects such as cars, furniture, etc. And even if the trim is subject to sudden transformation such as twisting and the like, the metal carrier will not come out of the covering material because the marginal region is left connected. In the Example 1, the transverse slot portion is not punched, so that it is possible to save material for the metal carrier, thus contributing to low cost.

EXAMPLES 2 TO 4

Figure 10:
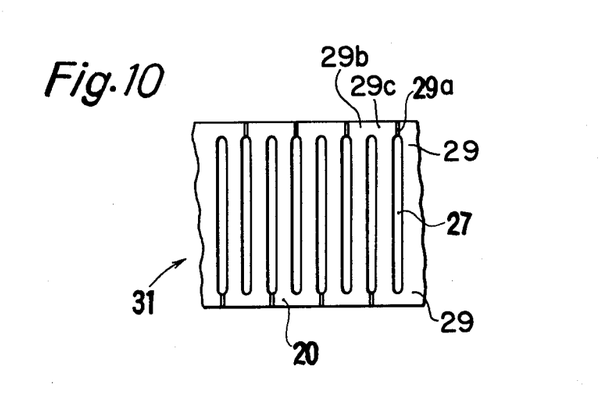
FIG. 10 is a plan view showing the metal carrier of the Example 2 of the present invention.
Figure 11:
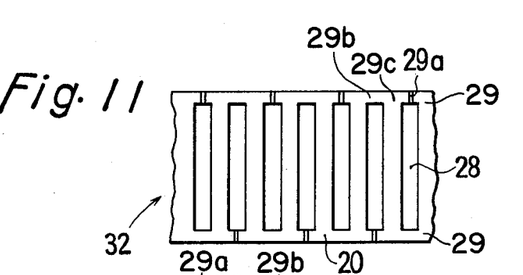
FIG. 11 is a plan view showing the metal carrier of the Example 3 of the present invention.

The examples 2 to 3 shown in FIGS. 10 to 11 refer to the metal carriers 31 and 32 which have a strip-like element 20 with transverse slots 27 or rectangular slots 28. Thin link portions 29a in the transverse direction, link portions 29b having a thickness the same as the link 29, and intermediate portions 29c are arranged at proper intervals in the longitudinal direction of link 29. The thin link portions 29a which can be easily cut by external force, are alternatively diaposed in a zigzag pattern.

Figure 12:
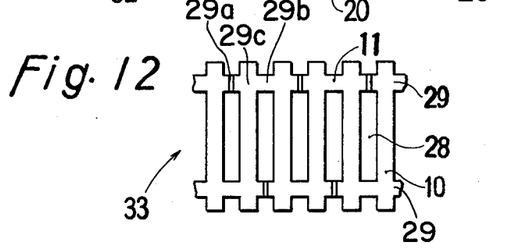
FIG. 12 is a plan view showing the metal carrier of the Example 4 of the present invention.

The example 4 shown in FIG. 12 refers to the metal carrier 33 in which the link 29 at top and bottom of the rectangular slot 28 shown in FIG. 12 has a thin portion 29a which can be easily cut by an external force. The thin portions 29a are alternately disposed on opposite sides in a zigzag pattern.

The embodiment of the above examples 2 to 4 is as same as that of the example 1. That is, since the metal carriers 31, 32 and 33 are connected at top and bottom of the transverse slot 27, 28, they do not transform in the transverse direction nor expand in the longitudinal direction, so that the working characteristics while extruding are good. And, even if a thin link portion 29a is cut in the course of extruding, the cut spots will be few and other marginal regions of the link 29 are left connected, so that expansion in the longitudinal direction will rarely happen nor have an influence upon the working characteristics while extruding. And, since the metal carrier is continuously embedded into the trim with the thin link portions 29a in zigzag pattern, the trim has flexibility and elasticity as well as having good working characteristics for applying it to objects such as motorcars, furniture, etc. Further, even if the trim is subject to sudden transformation such as twisting and the like, since substantial portions of the marginal region or link 29 are left connected the metal carriers 31, 32 and 33 will not come out of the covering material.

EXAMPLES 5 TO 6

Figure 13:
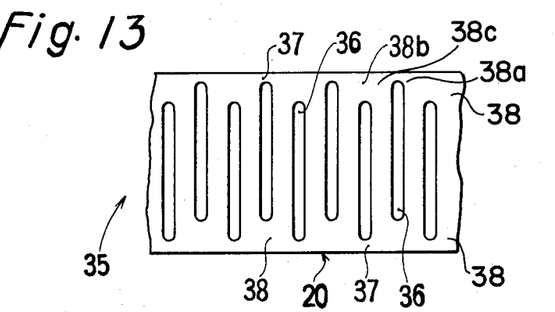
FIG. 13 is a plan view showing the metal carrier of the Example 5 of the present invention.

In the above examples 1 to 4, the links 29 at top and bottom of the transverse slots 27, 28 are equal in width, wherein by making one side of a pair of connecting links alternately thin link portions 29a the sectional area of the thin link portion becomes small to facilitate splitting. In examples 5 to 6, by changing the width of the links, the width becomes alternatively wide and narrow. FIG. 13 shows the metal carrier 35 of the example 5.

That is, the metal carrier 35 comprises the strip-like element, in the longitudinal direction of which, many transverse slots 36 are disposed at proper intervals and are alternately positioned closer to the opposite edges of the carrier 35.

Figure 14:
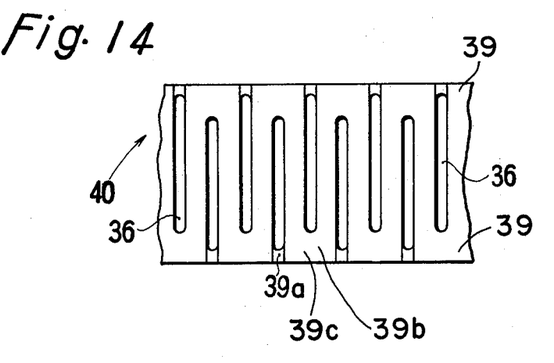
FIG. 14 is a plan view showing the metal carrier of the Example 6 of the present invention.

In the example 6 shown in FIG. 14 the metal carrier 40 of another example is provided with a link 39 having a thin narrow portion 39a which is made thinner than link portion 39b and intermediate portion 39c.

Next, the embodiment of these examples 5 to 6 will be described.

Like the examples 1 to 4, the outside of the carrier is covered with rubber or plastics, the outside of the covering material is embossed and, if the covering material is made of rubber, vulcanized, and then the narrow link portion 38a or 39a is cut by applying an external force and the trim of a desired curved section is formed.

When the external force is applied before transforming the trim to the curved form, the metal carrier 35 or 40 presents a zigzag pattern connected only at the link portions 38b or 39b, so that the trim has flexibility and elasticity for application of the trim. That is, since the above external force is concentratingly applied to the narrow portion 38a or narrow thin link portion 39a, only this portion is cut, and the metal carrier 35 or 40 has a zigzag pattern.

Moreover, in the drawings, the top and bottom connecting links having the transverse slots disposed at regular intervals are formed with alternately wide and narrow link portions. This is likewise applicable to a metal carrier where the links are formed inward from both marginal regions with the links arranged in like rail sleepers. Further, even the width of the links is the same and the thin portions are alternatively punched in a zigzag pattern on the aforementioned links, the width of the connecting links becomes substantially narrower, thus providing the same function and effect with the aforementioned examples.

Now, the results of the tests conducted using the metal carrier 31, 35 and 40 of the examples 2, 5 and 6 will be described.

Figure 15:
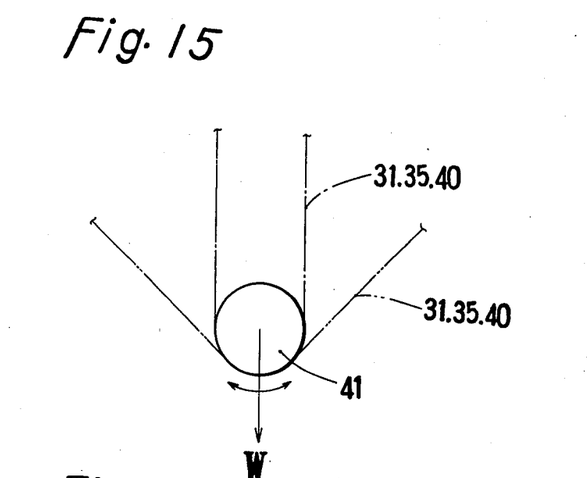
FIG. 15 is a side view showing the outline of the bending strength test.

As shown in FIG. 15, applying the load W to the free rotating roller 41 and having the metal carrier reciprocatingly move in the arrow directions, the frequency by the time the metal carriers present the zigzag movement has been determined. Wherein, a test has been conducted under the condition that the metal carriers are prevented from spliting with gum tape made of cloth pasted up on both longitudinal sides of the metal carriers.

Figure 17:
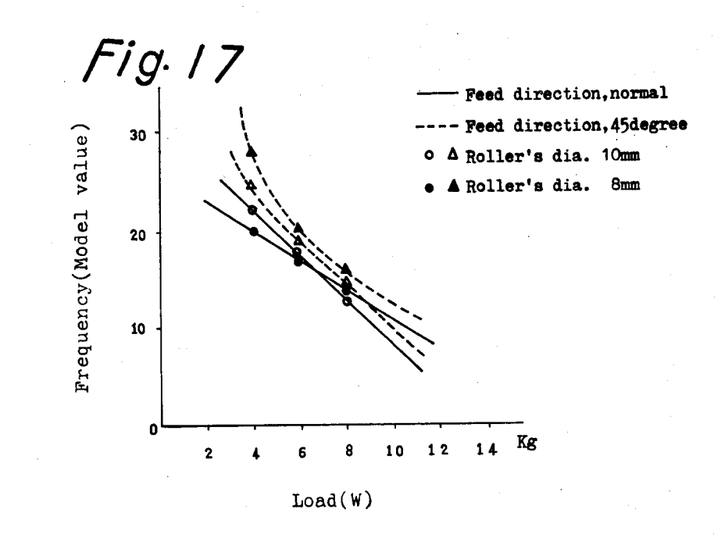
FIG. 17 is a diagram showing the result of the bending strength test in the Example 5.
Figure 18:
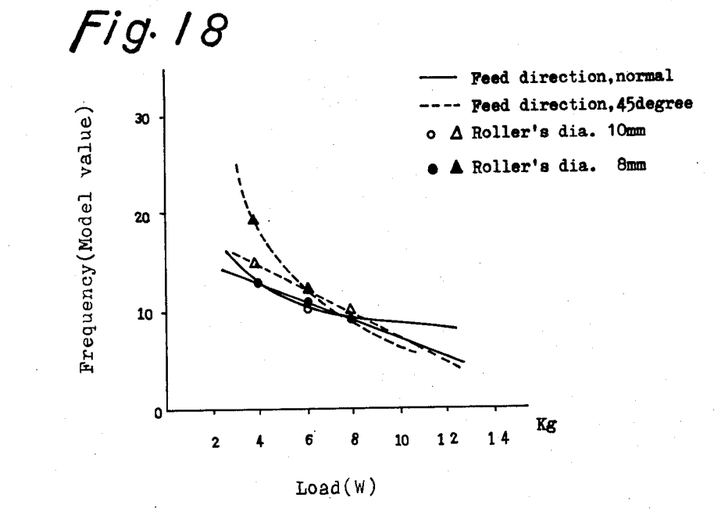
FIG. 18 is a diagram showing the result of the bending strength test in the Example 6.

Rollers' diameter: 8 mm, 10 mm
Load W (Kg): 4, 6, 8
Feed direction of metal carriers: Normal direction and 45 degree direction The result of the above test will be shown in FIGS. 17 to 18.

Table 1

| Angle | Example | Load | Roller's dia 8mm Frequency | Model Value | 10mm Frequency | Model Value |
|---|---|---|---|---|---|---|
| Nor- | | 4 | 19,20,20 | 20 | 22,20,24 20,20 | 22 |
| mal | #5 | 6 | 16,17,17 | 17 | 17,18,18 19,16 | 18 |
| di- | | 8 | 13,14,14,14 | 14 | 13,16,14 13,13 | 13 |
| rec- | | 4 | 12,13,13 | 13 | 14,12,13,13 13,13,12 | 13 |
| tion | #6 | 6 | 11,11,11 | 11 | 10,12,9 10,10 | 10 |
| | | 8 | 8,9,9 | 9 | 9,9,9 | 9 |
| 45 de- | | 4 | 28,28,30,27 | 28 | 24,26,25,25 | 25 |
| gree | #5 | 6 | 20,20,18 | 20 | 19,19,20, 18,18 | 19 |
| di- | | 8 | 16,16,16 | 16 | 15,15,16 | 15 |
| rec- | | 4 | 18,19,19 | 19 | 15,14,15, 16,16 | 15 |
| tion | #6 | 6 | 12,12,12 | 12 | 11,12,12,12 | 12 |
| | | 8 | 9,9,10 | 9 | 10,10,10,9 | 10 |

In case of the metal carrier of the example 2, it has not been always split in zigzag. In the case of metal carriers of examples 5 (FIG. 13) and 6 (FIG. 14), however, the carriers were not entirely divided into pieces but rather cut in a zigzag pattern at the required frequency, although the test has been conducted as far as a frequency of 50.

Tensile strength test

Figure 16:
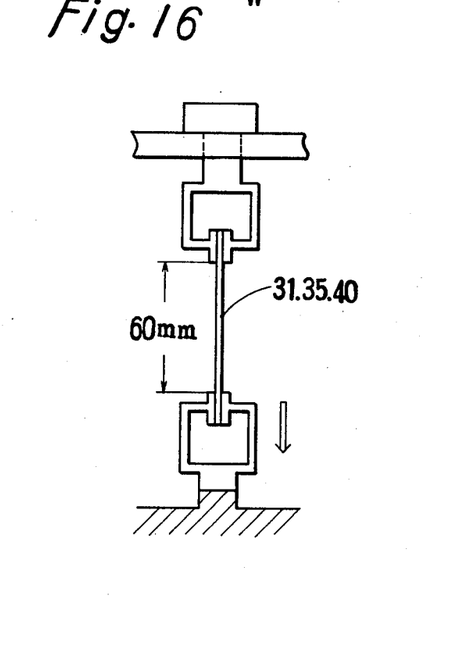
FIG. 16 is a side view showing the outline of the tensile strength test.

Using a apparatus shown in FIG. 16, the test has been conducted with the metal carrier chucked at the both ends, the result of which will be shown in Table 2.

Measuring condition: 23° C. (therms)
Tensile velocity: 25 mm/min
Distance between chucks: 60 mm Table 2

| No. Example | 1 | 2 | 3 | 4 | 5 | 6 | 7 | 8 | 9 | 10 | 11 | 12 | Average value |
|---|---|---|---|---|---|---|---|---|---|---|---|---|---|
| #2 | 120 | 116 | 119 | 116 | 120 | 119 | 120 | 122 | 101 | 109 | 110 | 121 | 117 |
| #5 | 72 | 75 | 68 | 74 | 74 | 75 | 76 | 74 | 69 | 73 | 69 | | 73 |
| #6 | 67 | 66 | 59 | 69 | 63 | 56 | 62 | 64 | 58 | 67 | 70 | | 64 |

Generally tensile strength is proportional to the sectional area. Out of the connecting links of each specimen, comparing the sectional areas of the smaller ones, it is as follows:

| | |
|---|---|
| Example 2 | 0.01 (cm$^2$) |
| Example 5 | 0.0075 (cm$^2$) |
| Example 6 | 0.006 (cm$^2$) | which coincides with the result of the test in Table 2. In common, the metal carrier is subject to backpressure of as much as 50 to 60 kilograms, so that there is no problem on tensile strength in the case of the abovementioned specimens.

The present invention comprises structure as aforementioned and produces effect as follows:

(a) Since the top and bottom of the transverse slots of the metal carrier are connected by links, the carrier does not transform in the transverse direction nor expand in the longitudinal direction and has good working characteristics in the course of extruding trim.

(b) The found trim is cut at the thin link portion and/or narrow width portion of the links at the top and bottom of the transverse slots in the metal carrier prior to bending into a U-shaped form, so that the working characteristics for applying it to an object are good.

(c) For the same reason as the above (b), i.e., the metal carrier which is embedded into the trim has a zigzag pattern even if the trim is subject to sudden transformation such as twisting and the like, the carrier does not come out of the covering material.

(d) In the examples 5 to 6, the links at the top and bottom of the transverse slots of the metal carrier have alternate thin link portions or narrow link portions, so that the connecting links to be cut are easily cut by applying an external force after extruding.

The invention claimed is:

1. A metal carrier to be embedded into rubber or plastic for use as trim, said metal carrier comprising: an elongated metal strip, a plurality of transverse slots across said strip in the central portion thereof, and link means adjacent the central portion of said strip on each side thereof, each said link means being continuous and including a plurality of first link portions having a thickness equal to the thickness of said strip, a plurality of second thin link portions having a thickness less than the thickness of said strip, and a plurality of intermediate link portions having a thickness equal to the thickness of said strip for connecting said first and second link portions, wherein said link means are positioned with respect to said plurality of slots such that a said first link portion of said link means is adjacent to one end of a first of said slots and a said second thin link portion of said link means is adjacent to the other end of said first of said slots and a said second thin link portion of said link means is adjacent to the one end of a second one of said slots and a said first link portion of said link means is adjacent to the other end of the second of said slots wherein the first and second ones of said slots are adjacent to each other.

2. A metal carrier as set forth in claim 1 wherein said first and second link portions of said link means are recessed from the edges of said strip.

3. A metal carrier as set forth in claim 1 wherein the edges of said first and second link portions of said link means coincide with the edges of said strip.

4. A metal carrier to be embedded into rubber or plastic for use as trim, said metal carrier comprising: an elongated metal strip, a plurality of transverse slots across said strip in the central portion thereof, and link means adjacent the central portion of said strip on each side thereof, each said link means being continuous and including a plurality of first link portions having a first width, a plurality of second narrow link portions having a second width which is less than said first width and a plurality of intermediate link portions having said first width connecting said first and second link portions, wherein said link means are positioned with respect to said plurality of slots such that a said first link portion of said link means is adjacent to one end of a first of said slots and a said second narrow link portion of said link means is adjacent to the other end of said first of said slots and a said second narrow link portion of said link means is adjacent to the one end of a second one of said slots and a said first link portion of said link means is adjacent to the other end of the second of said slots wherein the first and second ones of said slots are adjacent to each other.

5. A metal carrier as set forth in claim 4 wherein said first and second link portions of said link means are recessed from the edges of said strip.

6. A metal carrier as set forth in claim 4 wherein the edges of said first and second link portions of said link means coincide with the edges of said strip.

7. A metal carrier as set forth in claim 4 wherein said first link portions of said link means have a thickness equal to the thickness of said strip, said second narrow link portions having a thickness less than the thickness of said strip and said intermediate link portions have a thickness equal to the thickness of said strip.

8. A metal carrier as set forth in claim 7 wherein said first and second link portions of said link means are recessed from the edges of said strip.

9. A metal carrier as set forth in claim 7 wherein the edges of said first and second link portions of said link means coincide with the edges of said strip.

* * * * *